(12) United States Patent
Morita

(10) Patent No.: US 7,762,516 B2
(45) Date of Patent: Jul. 27, 2010

(54) WALL HANGING DISPLAY APPARATUS

(75) Inventor: Shinji Morita, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/785,155

(22) Filed: Apr. 16, 2007

(65) Prior Publication Data
US 2007/0246627 A1  Oct. 25, 2007

(30) Foreign Application Priority Data
Apr. 17, 2006  (JP)  .............................. 2006-112939

(51) Int. Cl.
A47G 1/16 (2006.01)
(52) U.S. Cl. .................................... 248/475.1; 248/917
(58) Field of Classification Search ................ 248/470, 248/472, 475.1, 489; 16/355; 40/712, 757
See application file for complete search history.

(56) References Cited

U.S. PATENT DOCUMENTS

| | | | |
|---|---|---|---|
| 4,858,351 A * | 8/1989 | Sewell et al. ................. | 40/712 |
| 2003/0038222 A1* | 2/2003 | Holmes ................... | 248/475.1 |
| 2005/0072894 A1* | 4/2005 | Grant ...................... | 248/475.1 |
| 2005/0127263 A1* | 6/2005 | Lemire .................... | 248/475.1 |
| 2005/0178941 A1* | 8/2005 | Burns et al. .............. | 248/475.1 |
| 2006/0054771 A1* | 3/2006 | Lie ............................ | 248/489 |
| 2007/0108363 A1* | 5/2007 | Metheny ................... | 248/539 |

FOREIGN PATENT DOCUMENTS

| | | |
|---|---|---|
| CN | 1674772 A | 9/2005 |
| JP | U-5-34301 | 5/1993 |
| JP | 9-127882 | 5/1997 |
| JP | 10-74051 | 3/1998 |
| JP | 10-215076 | 8/1998 |
| JP | 10-232619 | 9/1998 |
| JP | 11-24576 | 1/1999 |
| JP | 11-184395 | 7/1999 |
| JP | 2000-70085 A | 3/2000 |
| JP | 2000-161318 | 6/2000 |
| JP | 2000-201946 A | 7/2000 |
| JP | 2000-206901 | 7/2000 |
| JP | 2000-216553 A | 8/2000 |
| JP | 2001-236024 A | 8/2001 |
| JP | 2001-241427 | 9/2001 |
| JP | 2002-32028 A | 1/2002 |
| JP | 2002-229464 | 8/2002 |
| JP | 2006-002420 A | 1/2006 |
| JP | 2006-53212 A | 2/2006 |
| RU | 2017354 C1 | 7/1994 |

* cited by examiner

*Primary Examiner*—Ramon O Ramirez
(74) *Attorney, Agent, or Firm*—Morgan Lewis & Bockius LLP

(57) ABSTRACT

A wall hanging display apparatus including a wall side attachment member that is fixed to a wall; and a apparatus side attachment member that is fixed to the display apparatus and is connected to the wall side attachment member, is characterized by a structure in which only one of the wall side attachment member and only one of the apparatus side attachment member are used for hanging the display apparatus on the wall.

4 Claims, 6 Drawing Sheets

WALL HANGING DISPLAY APPARATUS

This application is based on Japanese Patent Application No. 2006-112939 filed on Apr. 17, 2006, the contents of which are hereby incorporated by reference.

BACKGROUND OF THE INVENTION

1. Field of the Invention

The present invention relates to a display apparatus. In particular, the present invention relates to a wall hanging display apparatus equipped with a wall side attachment member that is fixed to a wall and an apparatus side attachment member that is connected to the wall side attachment member.

2. Description of Related Art

Recently, display apparatuses with reduced thickness have become widely available. For example, a liquid crystal display (LCD), a plasma display panel (PDP), and an electroluminescent (EL) display are typical ones. It is proposed to use the display apparatus with reduced thickness as a photo stand by providing a stand to the back face of the apparatus and placing the apparatus on the desk or the like in a tilted manner. In addition, it is also proposed to use the display apparatus with reduced thickness by hanging on a wall instead of placing on a desk. Conventional examples of wall hanging display apparatuses are described below.

For example, JP-A-2000-206901 discloses a universal mount unit including a display side universal mount unit having a structure in which a mounting bracket like parallel crosses and a rod-like mounting bracket with predetermined tube lengths at four corners of the mounting bracket like parallel crosses are attached to the back face of a flat panel display in an engaging direction corresponding to the attachment direction of the flat panel display, and a fixing side universal unit having a structure in which a predetermined number of mounting brackets for hanging on a wall or from a ceiling for fixing the rod-like mounting bracket are provided to predetermined positions that enable fixing to a wall and engagement with the rod-like mounting bracket In addition, JP-A-11-24576 discloses a wall hanging video apparatus having a structure in which a first U-shaped mounting bracket having pins standing on both side faces at upper portions and lower portions is fixed to the back face of the video apparatus, and a second U-shaped mounting bracket having concave recesses on both side faces at upper portions and hook notches on both side faces at lower portions is fixed to a wall face, and the pins of the upper portions are engaged with the concave recess while the pins of the lower portions are engaged with the hook notch so that the video apparatus is attached to the wall.

In addition, JP-A-10-215076 discloses a wall hanging device for a equipment cabinet including a main body of the wall hanging device with a plurality of hooks that engage a plurality of engaging holes provided to the back face of the equipment cabinet, and a lock means that prevents the equipment cabinet from moving in the direction that permits the hooks to detach from the engaging holes.

In addition, JP-U-5-34301 discloses a cabinet fixing structure. In this structure, a fixing bracket is attached to the cabinet in a movable manner, and the tip of the fixing bracket is housed in the cabinet. In this state, an upper cabinet side hook is engaged with an upper fixed side hook, while a cabinet side hook is engaged with a lower fixed side hook. Then, the fixing bracket is moved in the direction toward a cabinet fixing face so that the cabinet can be fixed.

According to the structures in all of the above mentioned publications of JP-A-2000-206901 to JP-U-5-34301, the display apparatus is fixed to the wall side component at four positions so that sufficient stability can be obtained. However, there are problems of much time and effort for attaching the components, increasing components, and the complicated structure, resulting in an increase of cost

SUMMARY OF THE INVENTION

In view of the above described problem, it is an object of the present invention to provide a wall hanging display apparatus that can reduce time and effort for attaching the components for wall hanging, and reduce cost of components.

To attain the above described object, a wall hanging display apparatus in accordance with one aspect of the present invention includes: a wall side attachment member that is fixed to a wall; and a apparatus side attachment member that is fixed to the display apparatus and is connected to the wall side attachment member. Further, the wall hanging display apparatus in characterized by a structure in which only one of the wall side attachment member and only one of the apparatus side attachment member are used for hanging the display apparatus on the wall.

In the above described first aspect of the present invention, the wall hanging display apparatus is further characterized by a structure in which the wall side attachment member has a hole, while the apparatus side attachment member has a shaft that can be inserted in the hole in a detachable manner.

In the above described first aspect of the present invention, the wall hanging display apparatus is further characterized by a structure in which the horizontal cross section of the hole and the horizontal cross section of the shaft have D-shapes.

In the above described first aspect of the present invention, the wall hanging display apparatus is further characterized by including a lock portion for locking the shaft after the shaft is inserted in the hole.

In the above described first aspect of the present invention, the wall hanging display apparatus is further characterized by a structure in which the lock portion is made up of a protrusion formed on the shaft adjacent to its distal end and a rim of the hole, and the protrusion engages the rim of the hole to be locked.

In the above described first aspect of the present invention, the wall hanging display apparatus is further characterized by a structure in which the distal end of the shaft is provided with a slit so that a bifurcated portion is formed.

In the above described first aspect of the present invention, the wall hanging display apparatus is further characterized by including a foldable stand that protrudes from the back face of the display apparatus, and further characterized by a structure in which the apparatus side attachment member is attached to the stand.

To attain the above described object, a wall hanging display apparatus in accordance with another aspect of the present invention includes: a wall side attachment member that is fixed to a wall; wall hanging display apparatus comprising: a wall side attachment member that is fixed to a wall; a apparatus side attachment member that is fixed to the display apparatus and is connected to the wall side attachment member; a foldable T-shaped stand that protrudes from the back face of the display apparatus, the apparatus side attachment member being attached to the stand; and a lock portion for locking the shaft after the shaft is inserted in the hole. Further, the wall hanging display apparatus is characterized by a structure in which only one of the wall side attachment member and only one of the apparatus side attachment member are used, the wall side attachment member has a hole, while the apparatus side attachment member having the shaft that can be inserted in the hole in a detachable manner, the horizontal cross section of the hole and the horizontal cross section of the shaft have D-shapes, the distal end of the shaft is provided with a slit so that a bifurcated portion is formed, and the lock portion consists of a protrusion formed on one side of the bifurcated portion adjacent to its distal end and a rim of the hole.

According to the present invention, the display apparatus can be hung on the wall by the attaching only one of the wall side attachment member and only one of the apparatus side attachment member, so that time and effort for attaching can be reduced. Furthermore, since the number of components is small, cost of components can be reduced.

In addition, since the wall side attachment member has a hole while the apparatus side attachment member has a shaft that can be inserted in the hole, the display apparatus can be hung on the wall only by inserting the shaft in the hole easily. Furthermore, since structures of components for wall hanging are simple, cost of components can be reduced.

In addition, since the horizontal cross section of the hole and the horizontal cross section of the shaft have D-shapes or the like, the display apparatus hung on the wall can be prevented from rotating around the shaft.

In addition, since the protrusion engages the rim of the hole to be locked, the shaft is prevented from detaching from the hole so that the display apparatus is prevented from dropping from the wall due to an unintended external force.

In addition, since the tip of the shaft is provided with the slit forming the bifurcated portion, the bifurcated portion can be deformed elastically when the shaft is inserted in the hole or is detached from the same, so that the protrusion can be inserted or detached easily.

In addition, since the apparatus side attachment member is attached to the stand, the apparatus side attachment member does not become an obstacle when the display apparatus is placed on the desk or the like as a photo stand. Therefore, it is possible to secure compatibility between the wall hanging display apparatus and the photo stand type display apparatus.

DETAILED DESCRIPTION OF THE PREFERRED EMBODIMENTS

Figure 1:
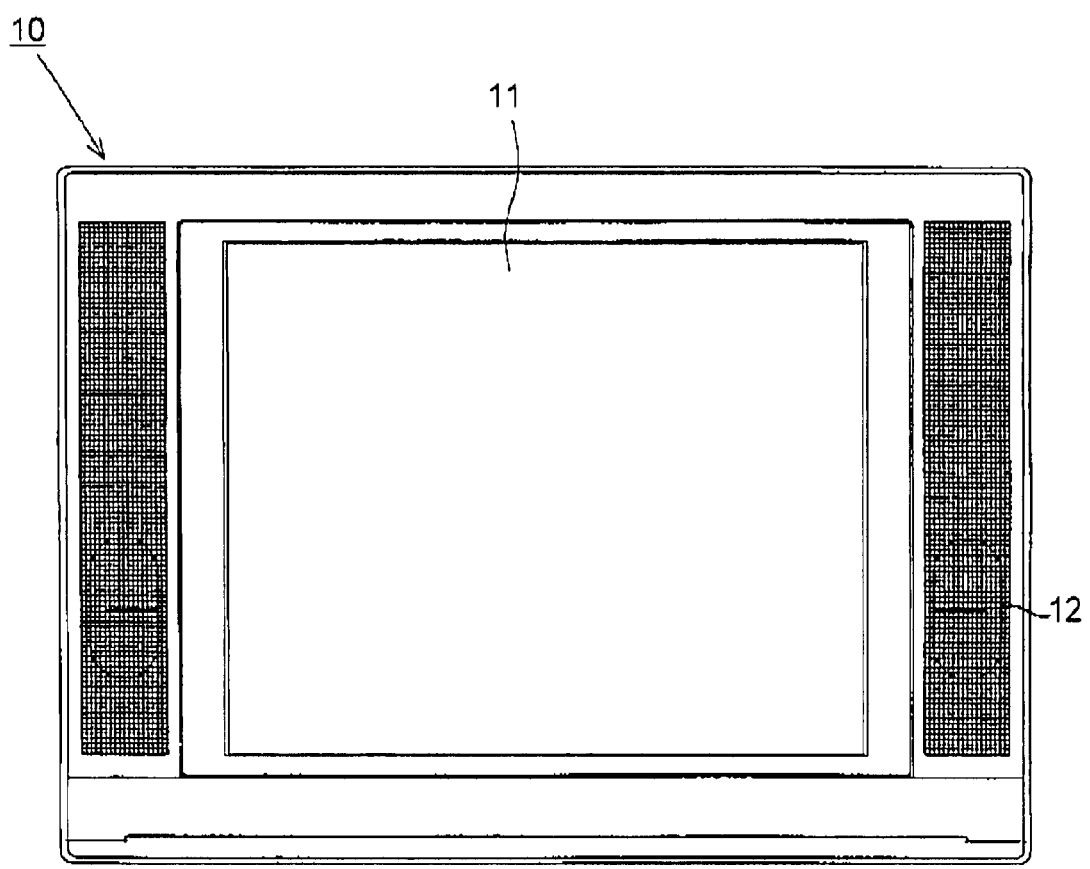
FIG. 1 is a front view of a display apparatus that is attached to a wall.
Figure 2:
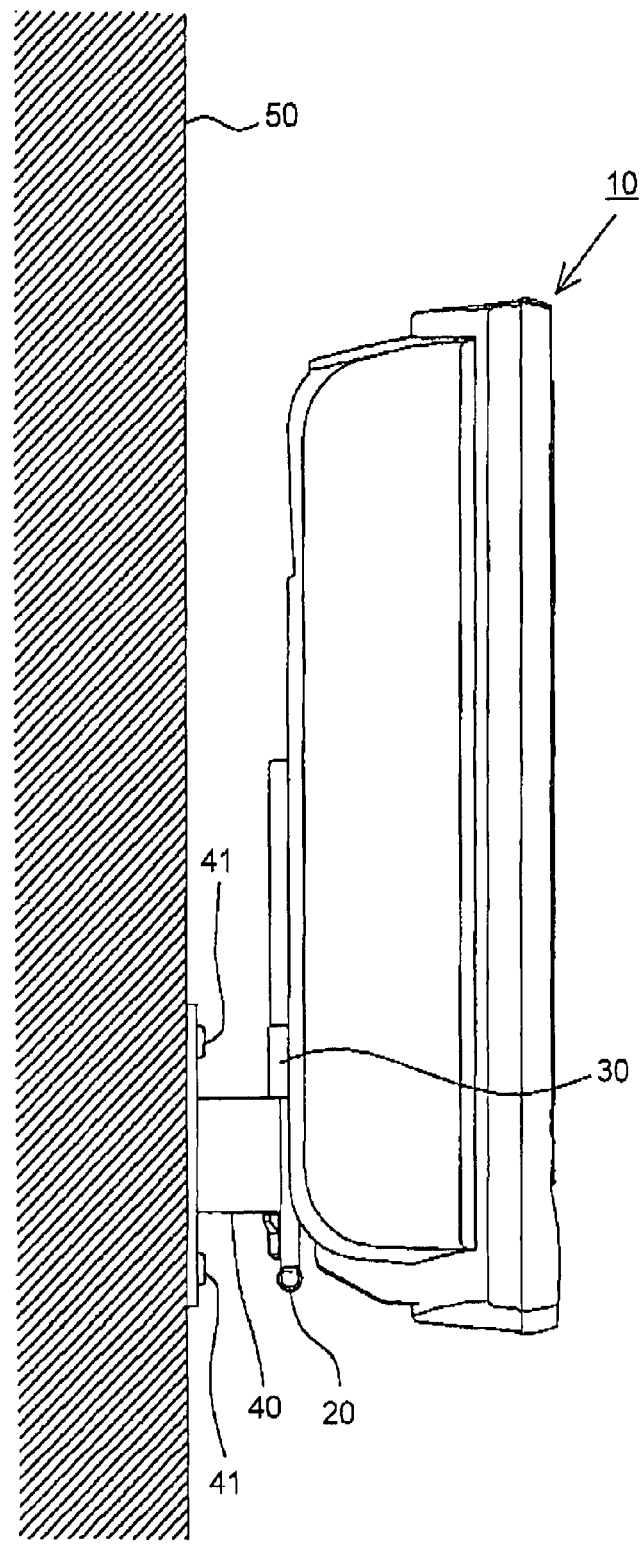
FIG. 2 is a side view of the display apparatus that is attached to a wall.

FIG. 1 is a front view of a display apparatus that is attached to a wall, and FIG. 2 is a side view of the display apparatus that is attached to a wall. A display apparatus 10 is equipped with a screen 11 and speakers 12 at the front side, and a stand 20 is disposed on the back face side thereof. When the stand 20 is drawn out, the display apparatus 10 is placed on a desk or the like in a tilted manner and can be used as a photo stand.

The stand 20 is provided with an apparatus side attachment member 30. On the other hand, a wall side attachment member 40 for hanging the display apparatus 10 on the wall is fixed to a wall 50 with screws 41 or the like. The apparatus side attachment member 30 is connected to the wall side attachment member 40. By this structure, the display apparatus 10 is attached to the wall. At this point, the stand 20 is not always necessary for attaching the display apparatus 10 to the wall. If the stand 20 is eliminated, the apparatus side attachment member 30 may be attached to the back face of the display apparatus 10 directly.

Figure 3:
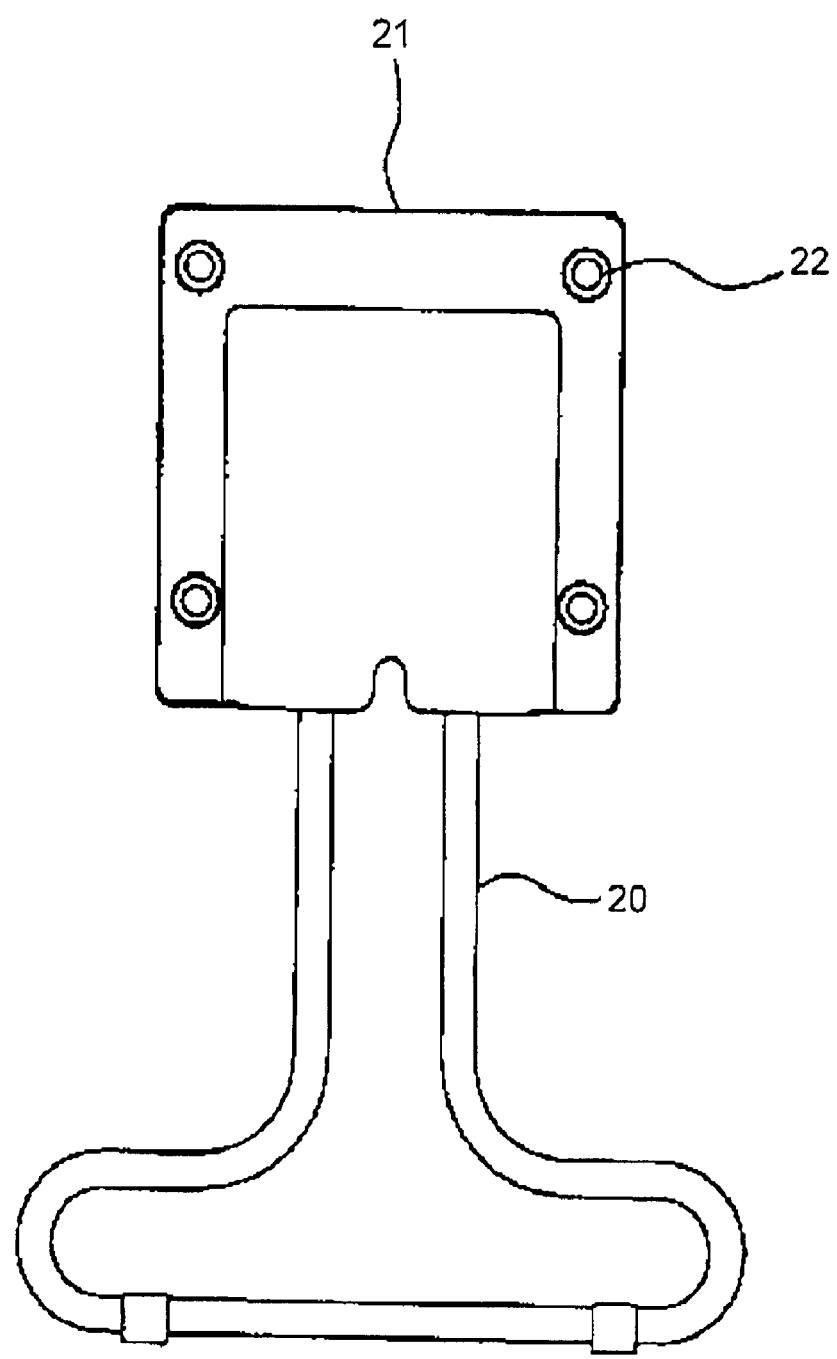
FIG. 3 is a rear view of a stand of the display apparatus.

FIG. 3 is a rear view of a stand 20 of the display apparatus. The stand 20 is made of a metal rod that is bent in a T-shape. The shape of the stand 20 is not limited to a particular one, but it should be a shape that is capable of supporting the display apparatus 10. The stand 20 is attached to a resin plate 21 having a substantially rectangular shape in a pivotable manner. Tapped holes 22 are formed on four corners of the plate 21, so that the plate 21 can be attached to the back face of the display apparatus 10 with screws. By tilting this stand 20 in the direction of separating from the back face of the display apparatus 10, the display apparatus 10 can be placed on a desk or the like in a tilted manner. On the other hand, in order to hang the display apparatus 10 on the wall, the stand 20 is set in the position parallel with the back face of the display apparatus 10 (in the folding state).

Figure 4A:
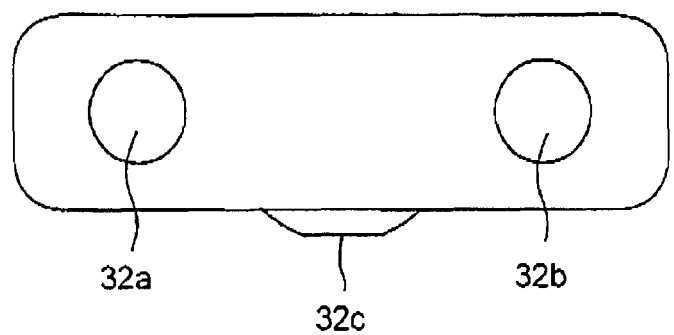
FIG. 4A is a top view of an apparatus side attachment member of the display apparatus.
Figure 4B:
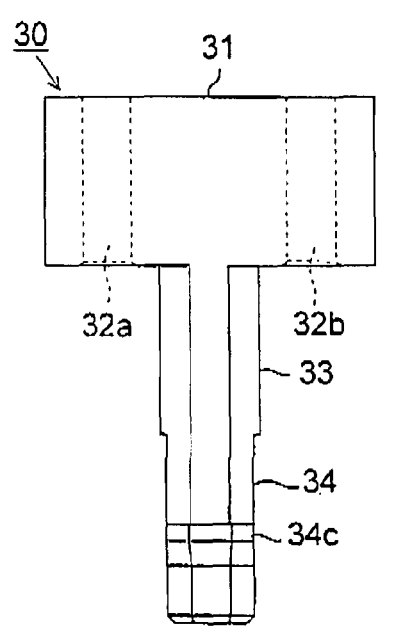
FIG. 4B is a rear view of the apparatus side attachment member.
Figure 4C:
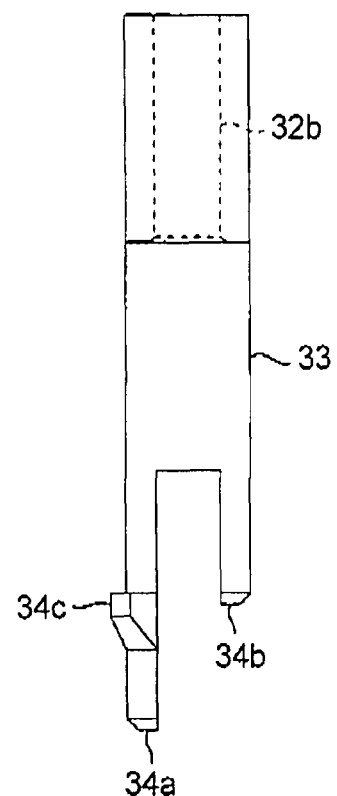
FIG. 4C is a left side view of the apparatus side attachment member and FIG. 4D is a bottom view of the apparatus side attachment member.
Figure 4D:
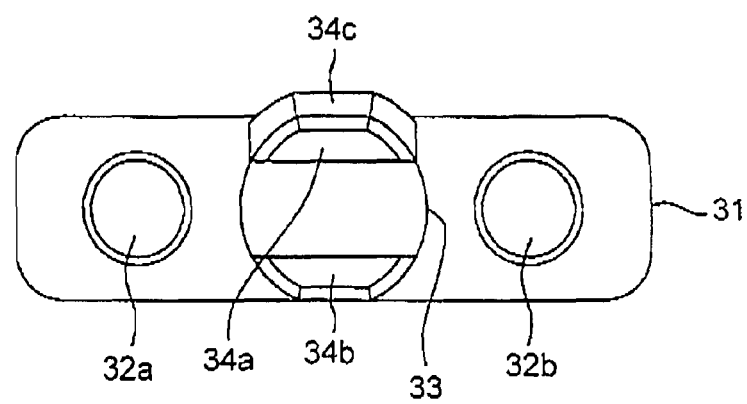

FIG. 4A is a top view of an apparatus side attachment member 30, FIG. 4B is a rear view of the apparatus side attachment member 30, FIG. 4C is a left side view of the apparatus side attachment member 30, and FIG. 4D is a bottom view of the apparatus side attachment member 30.

The apparatus side attachment member 30 is made of a resin, which can be polyoxymethylene (POM), polystyrene (PS) or the like. The apparatus side attachment member 30 has two holes 32a and 32b on the vicinities of both ends of its main body 31 so that the parts of the stand 20 near the plate 21 are inserted in the holes 32a and 32b. The stand 20 may fit in the holes 32a and 32b or may be inserted in the same with a clearance.

In addition, a shaft 33 protrudes from the lower surface of the main body 31 between the holes 32a and 32b so as to be connected to the wall side attachment member 40. The horizontal cross section of the shaft 33 can be a D-shape that is a part of a circle or a polygonal shape. FIG. 4 shows an example of a circular shape that is cut flat at two parts (at the front side and the rear side of the main body 31).

A distal end of the shaft 33 is provided with a slit that forms a bifurcated portion 34 (sec FIG. 4C). The bifurcated portion 34 is made up of a first shaft 34a and a second shaft 34b. The first shaft 34a is formed on the rear side of the apparatus side attachment member 30 and is longer than a depth of a hole 45 of the wall side attachment member 40 that will be described later. The second shaft 34b is formed on the front side of the apparatus side attachment member 30 and is shorter than the depth of the hole 45 of the wall side attachment member 40. At this point the first shaft 34a and the second shaft 34b have thicknesses that permit their elastic deformation in the horizontal direction by manual force.

A protrusion 34c is formed at the vicinity of the distal end of the first shaft 34a. The protrusion 34c is formed so as to protrude from the back face of the apparatus side attachment member 30, and it is adapted to engage the rim of the hole 45 of the wall side attachment member 40 that will be described later. In addition, the protrusion 34c has an inclined face on the inserting side so that it can enter the rim of the hole 45 of the wall side attachment member 40 easily as described later. On the other hand, the protrusion 34c has a right-angled face on the removing side so that it cannot be removed easily from the rim of the hole 45 of the wall side attachment member 40 in the engaged state as described later.

At this point, the slit formed in the distal end of the shaft 33 is not always necessary. In addition, lengths of the first shaft 34a and the second shaft 34b are not limited to the particular example. The second shaft 34b may be longer than the first shaft 34a, or they may have the same length. Furthermore, the protrusion 34c is also not always necessary.

Figure 5A:
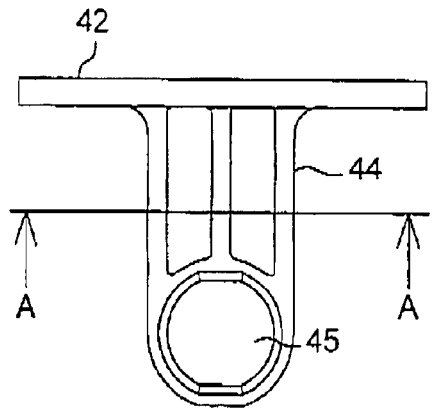
FIG. 5A is a top view of a wall side attachment member of the display apparatus.
Figure 5B:
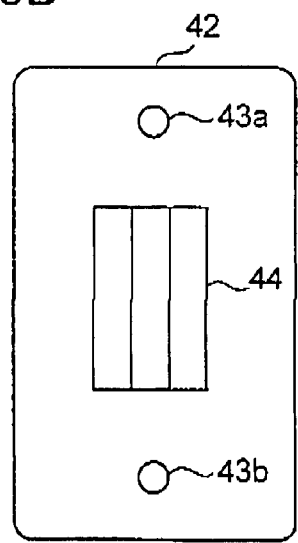
FIG. 5B is a front view of the wall side attachment member.
Figure 5C:
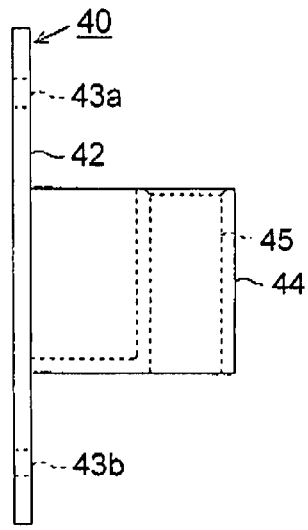
FIG. 5C is a left side view of the wall side attachment member.
Figure 5D:
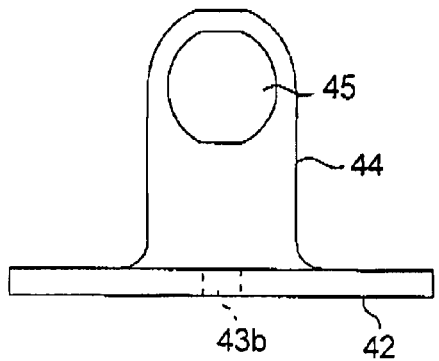
FIG. 5D is a bottom view of the wall side attachment member and FIG. 5E is a cross sectional view of a part of the front view of the wall side attachment member when cut along the line A-A in FIG. 5A.
Figure 5E:
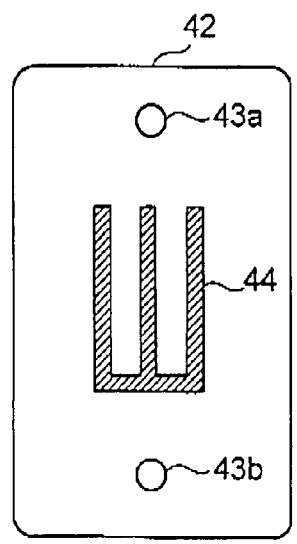

FIG. 5A is a top view of a wall side attachment member 40, FIG. 5B is a front view of the wall side attachment member 40, FIG. 5C is a left side view of the wall side attachment member 40, FIG. 5D is a bottom view of the wall side attachment member 40, and FIG. 5E is a cross sectional view when cut along the line A-A in FIG. 5A.

The wall side attachment member 40 is made of a resin that can be a POM, a PS or the like. The wall side attachment member 40 has two attachment holes 43a and 43b in its main body 42, and it is attached to the wall 50 with screws 41 or the like through the attachment holes 43a and 43b.

On the front side of the main body 42 in the vicinity of the middle, there is provided a protruding holder 44 to which the wall side attachment member 40 is connected. The holder 44 has a hole 45 extending in the vertical direction so that the shaft 33 of the apparatus side attachment member 30 is inserted in the hole 45. The horizontal cross section of the hole 45 has a shape corresponding to the horizontal cross section of the shaft 33. Thus, the shaft 33 can the inserted in the hole 45.

In addition, the length of the hole 45 (i.e., the length of the holder 44) is designed so that the protrusion 34c of the apparatus side attachment member 30 can engage the rim of the hole 45. In addition, the part of the holder 44 except the part forming the hole 45 has hollows as shown in FIG. 5E, so that weight and material cost are reduced while maintaining strength.

Instead of the above mentioned structure, it is possible to adopt the structure in which a recess is provided to the inner wall of the hole 45 at the position opposed to the protrusion 34c so that the protrusion 34c engages the recess. It is also possible to provide a protrusion on the inner wall of the hole 45 and a recess on the shaft 33 at the position opposed to the protrusion so that the protrusion engages the recess. According to these structures too, the apparatus side attachment member 30 can be locked with the wall side attachment member 40.

Figure 6:
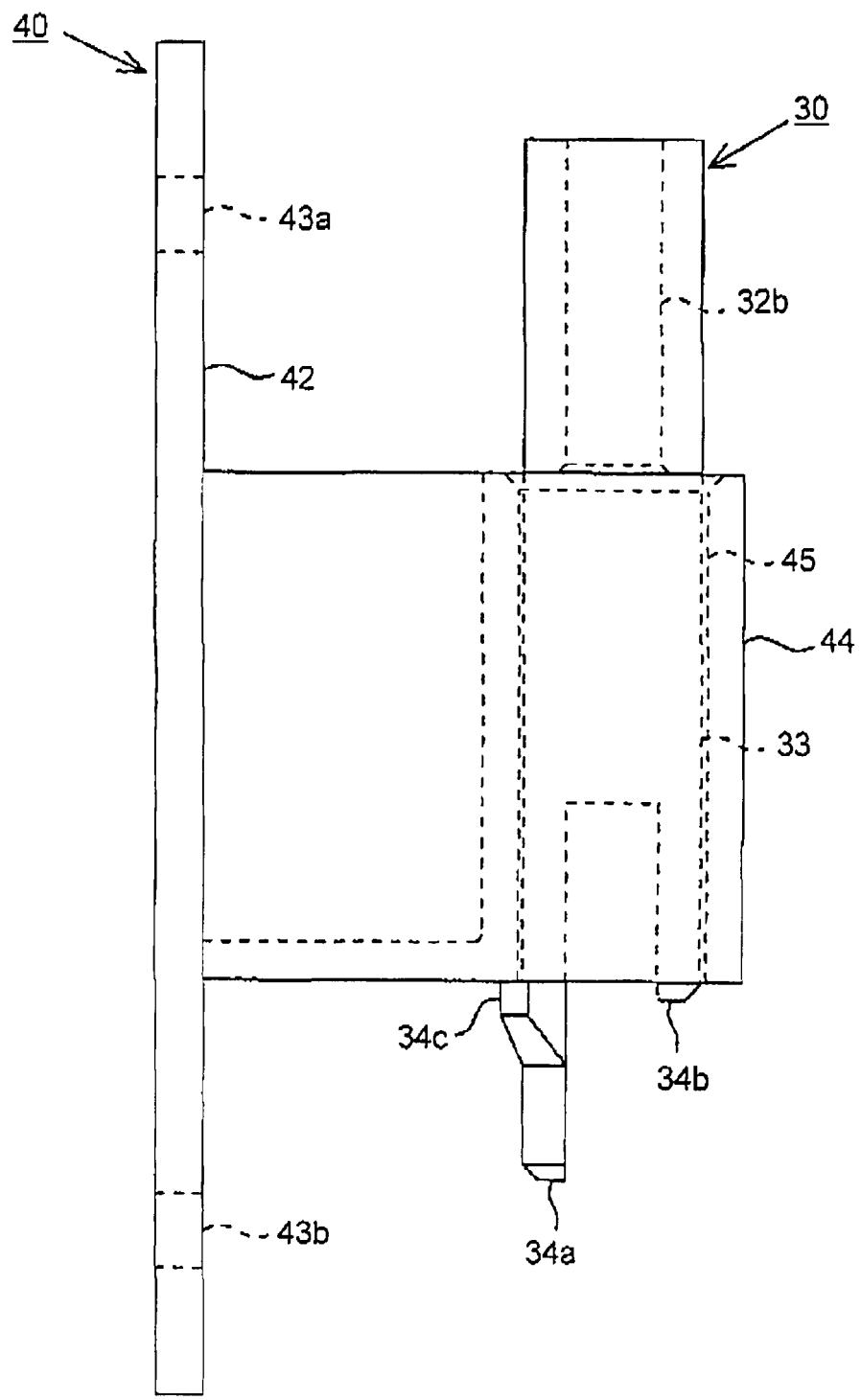
FIG. 6 is left side view of the wall side attachment member of the display apparatus to which the apparatus side attachment member is connected.

FIG. 6 is a left side view of the wall side attachment member 40 in the state where the apparatus side attachment member 30 is connected to the same. When the apparatus side attachment member 30 is connected to the wall side attachment member 40, the shaft 33 is inserted in the hole 45. Although the diameter of the shaft 33 with the protrusion 34c is larger than the diameter of the hole 45, the shaft 33 can be inserted into the hole 45 while the protrusion 34c is pressed by the inner wall of the hole 45 so that the first shaft 34a is deformed elastically because the inserting side of the protrusion 34c has the inclined face. When the protrusion 34c passes through the hole 45, the first shaft 34a goes back to the original state from the deformed state so that the protrusion 34c engages the rim of the hole 45. Thus, the shaft 33 is inserted and locked in the hole 45. As a result, the display apparatus 10 is fixed to the wall.

On the other hand, in order to remove the apparatus side attachment member 30 from the wall side attachment member 40, the apparatus side attachment member 30 (i.e., the display apparatus 10) is lifted while pressing the tip of the first shaft 34a protruding downward from the hole 45 toward the front side. Thus, the first shaft 34a is deformed elastically toward the front side, so that the protrusion 34c is detached from the rim of the hole 45 and the shaft 33 is removed from the hole 45. As a result, the display apparatus 10 is separated from the wall.

In this way, the display apparatus 10 is fixed to the wall with one wall side attachment member 40 and one apparatus side attachment member 30. Therefore, only by attaching one wall side attachment member 40 to the wall, the display apparatus 10 can be hung on the wall easily. Thus, the attaching time and effort can be reduced. In addition, since the number of components is small, cost of components can be reduced, too.

In addition, since the wall side attachment member 40 has the hole 45 while the apparatus side attachment member 30 has the shaft 33 that can be inserted in the hole 45, the display apparatus 10 can be hung on the wall easily only by inserting the shaft 33 in the hole 45. Furthermore, since the components for wall hanging have simple structures, cost of components can be reduced.

In addition, since the horizontal cross section of the hole 45 and the horizontal cross section of the shaft 33 have the D-shape or the like, the display apparatus 10 hanging on the wall can be prevented from rotating around the shaft 33.

In addition, since the protrusion 34c engages the rim of the hole 45 to be locked, the shaft 33 is prevented from detaching from the hole 45 so that the display apparatus 10 is prevented from dropping from the wall due to an unintended external force.

In addition, since the tip of the shaft 33 is provided with the slit forming the bifurcated portion 34, the bifurcated portion 34 can be deformed elastically when the shaft 33 is inserted in the hole 45 or is detached from the same, so that the protrusion 34c can be inserted or detached easily.

In addition, since the apparatus side attachment member 30 is attached to the stand 20, the apparatus side attachment member 30 does not become an obstacle when the display apparatus 10 is placed on the desk or the like as a photo stand. Therefore, it is possible to secure compatibility between the wall hanging display apparatus and the photo stand type display apparatus.

The wall hanging display apparatus of the present invention can be applied to a display apparatus with reduced thickness such as an LCD, a PDP or an EL display, and it can be used as a photo stand, too.

What is claimed is:

1. A wall hanging display apparatus comprising:
   a wall side attachment member that is fixed to a wall; and
   an apparatus side attachment member that is fixed to a display apparatus and is connected to the wall side attachment member, wherein
   only one of the apparatus side attachment having one shaft and only one of the wall side attachment having one hole are used, a distal end of the shaft is provided with a slit so that a bifurcated portion is formed, and the bifurcated portion is deformed elastically to fix the shaft in the hole when the shaft is inserted in the hole.

2. The wall hanging display apparatus according to claim 1, wherein the horizontal cross section of the hole and the horizontal cross section of the shaft have a circular shape at least one portion of which is cut away.

3. The wall hanging display apparatus according to claim 1, further comprising a foldable stand that protrudes from the back face of the display apparatus, wherein the apparatus side attachment member is attached to the stand.

4. A wall hanging display apparatus comprising:

a wall side attachment member that is fixed to a wall;

an apparatus side attachment member that is fixed to the display apparatus and is connected to the wall side attachment member;

a foldable T-shaped stand that protrudes from the back face of the display apparatus, the apparatus side attachment member being attached to the stand; and a lock portion for locking the shaft after the shaft is inserted in the hole, wherein only one of the wall side attachment member and only one of the apparatus side attachment member are used, the wall side attachment member has a hole, while the apparatus side attachment member having the shaft that can be inserted in the hole in a detachable manner, the horizontal cross section of the hole and the horizontal cross section of the shaft have a circular shape at least one portion of which is cut away, the distal end of the shaft is provided with a slit so that a bifurcated portion is formed, and the lock portion consists of a protrusion formed on one side of the bifurcated portion adjacent to its distal end and a rim of the hole.

* * * * *